May 19, 1970   A. W. WALLACE   3,512,559
WATER PRESSURE REGULATING VALVE FOR ROCK DRILL
Filed Dec. 18, 1967

INVENTOR
ARTHUR W. WALLACE
BY Joseph W. Holloway
ATTORNEY

United States Patent Office 3,512,559
Patented May 19, 1970

3,512,559
WATER PRESSURE REGULATING VALVE FOR ROCK DRILL
Arthur W. Wallace, Denver, Colo., assignor to Gardner-Denver Company, a corporation of Delaware
Filed Dec. 18, 1967, Ser. No. 691,325
Int. Cl. G05d 11/02
U.S. Cl. 137—98     2 Claims

ABSTRACT OF THE DISCLOSURE

A valve for mounting on a rock drill to control the pressure of drill hole cleaning water, comprising a partitioned casing divided into a flow chamber and a pressure chamber. A valve element located in the flow chamber is operated to throttle the flow of water past a seat by a differential diameter actuating piston located in the pressure chamber and attached to the valve element by a stem extending through the casing partition. The actuating piston divide the pressure chamber into a first cavity in which motive air for operating the drill is admitted to act on one face of the piston to open the valve, and a second cavity in which water at the pressure downstream of the valve seat is admitted to act on the opposite piston face tending to close the valve. Due to the differential areas of the opposing piston faces, the valve element moves with respect to its seat whereby pressure of the water supplied to the drill hole is maintained at some value proportional to and preferably less than the drill motive air pressure.

BACKGROUND OF THE INVENTION

Conventional rock drills when operated in mines, tunnels, or similar confined workings usually make use of water as the hole cleaning fluid to avoid concentrations of dust in the atmosphere in proximity to the drill operating personnel. Accepted practice in the design of rock drills is to provide an elongated tube extending from a gland or similar fitting at the rear of the drill through the interior of the drill and in communication with the hollow drill steel for conducting the hole cleaning water to the drill bit. Pressure and flow of the cleaning water are usually regulated by a manually operated valve located in the water supply line upstream of the drill.

In many drill workings, supply water pressure is often extremely high and also subject to fluctuation thereby rendering control of the water to the drill difficult and resulting in flooding of the drill work area. Also, if the pressure of the water passing through the drill exceeds the pressure of the drill, motive fluid, faulty seals or gaskets are likely to allow leakage of water into the interior of the drill motor and rotation mechanism thereby flooding the machine and contributing to corrosion and rapid wear of various parts.

Heretofore, conventional in-line water pressure regulators have been placed in the water supply line leading to the drill proper, however, these devices are often easily damaged and can be set to a fixed regulated pressure only.

There are also water control valves in the prior art which are operated between an open and closed position by means responsive to starting or stopping the drill motor; however, these valves do not in themselves provide pressure regulation of the water flowing to the drill steel.

SUMMARY OF THE INVENTION

The invention comprises a valve for proportioning the pressure of cleaning water to the pressure of the drill motive fluid. By utilizing the drill motive fluid pressure as the proportioning control medium, the cleaning water flowing through the drill can be kept at a pressure less than the drill motive fluid pressure. In the event of faulty sealing means within the drill mechanism, leakage of water into the interior areas of the drill normally subject only to the presence of the drill motive fluid is prevented.

The proportional value of water pressure to motive fluid pressure is provided by a differential area piston type valve actuator housed in a stepped pressure chamber formed by the valve casing. The valve actuator is attached to a stem portion of the valve element and is spring biased to hold the valve closed. The valve functions initially to pass cleaning water in response to drill motive fluid being admitted to the smaller face area of the actuator piston to overcome the bias of the closure spring. With admission of water through the valve stem to the opposing larger piston face at the pressure downstream of the valve element, the piston controls the valve opening to provide proportional pressure control of water to the drill steel.

An advantage of the invention is the compact construction of the complete valve assembly making possible mounting of the valve on the drill proper. The invention thereby improves the effective utilization of ligther and more portable type drills.

DESCRIPTION OF THE PREFERRED EMBODIMENTS

Figure 1:
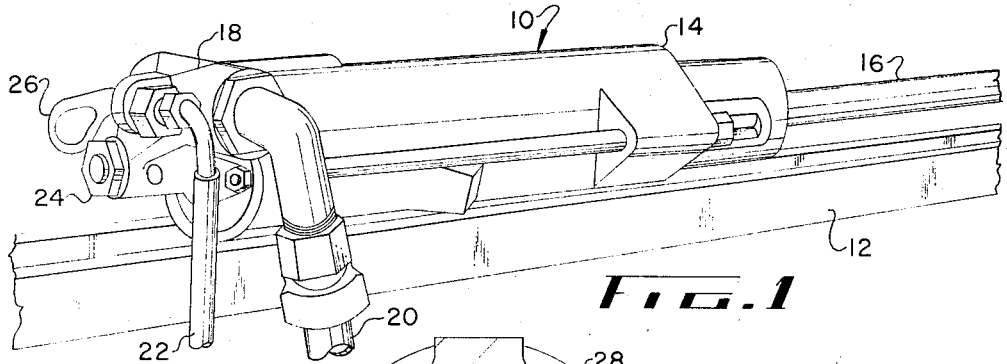
FIG. 1 is a perspective view of a typical compressed air operated rock drill mounted on a drill guide shell.

Referring to FIG. 1 a conventional or standard type rock drill is shown generally designated by the numeral 10. The drill is of the type commonly employed in mining and tunneling operations, such tools using compressed air as the motive fluid for powering a percussion motor. The exemplary drill is shown mounted on a support and feeding member known as the guide shell 12. The drill 10 comprises a main housing 14 containing the percussion motor and retaining the drill steel 16 extending from one end thereof. The opposite end of the rock drill comprises a housing end member 18 known as a backhead. The backhead 18 is adapted to provide connection to the drill of the compressed air hose 20 supplying motive fluid to the drill percussion motor, and a water supply hose 22 for providing hole cleaning water for purposes well known and previously discussed in the disclosure. Also visible in FIG. 1 is a portion of a water pressure regulating valve casing 24 which is threaded into a bore provided in the backhead 18 and illustrated in more detail in FIG. 2. As can be seen from FIG. 1, the water regulating valve is conveniently and compactly housed in the backhead. A drill motive fluid throttling valve is also located in the backhead in a transverse bore and is manually controlled by a handle 26.

Figure 2:
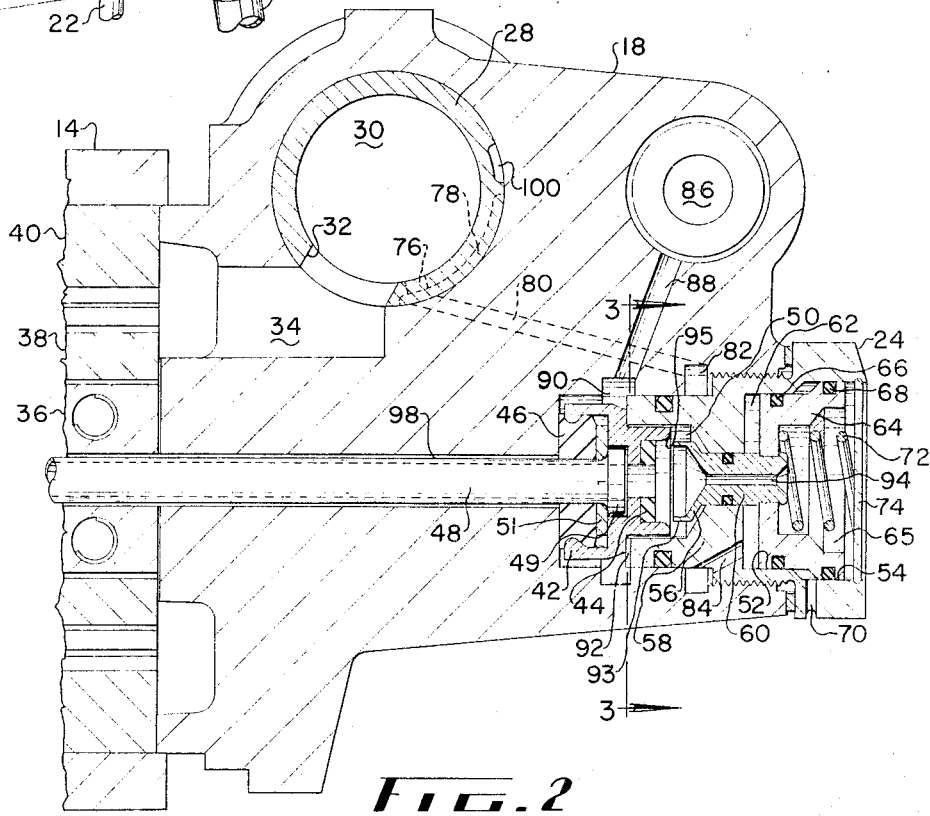
FIG. 2 is a longitudinal vertical section view of the back-head portion of the drill of FIG. 1 illustrating the location and details of the water pressure regulating valve.

In the longitudinal section view of FIG. 2, the drill motive fluid valve is shown as a hollow cylindrical element 28 housed in the backhead 18. Compressed air from the supply hose enters the hollow interior 30 of the valve 28 and in the position shown in FIG. 2 passes through the radial port 32 into the area 34, and then progresses to a motor distributing valve (not shown) for operating the drill percussion motor. Details of construction of the drill interior including the percussion motor and distributing valve have been omitted from the drawing as they are fairly conventional in the design of most rock drills and do not require to be discussed for the purpose of this disclosure. Partially shown in FIG. 2 is what is known as a rifle bar rotation mechanism comprising a rifle bar 36, a ratchet head 38 and a ratchet ring 40, here again mechanism well understood in the art. It is noteworthy to say that the area 34, the rifle bar rotation mechanism, and the distributing valve are all subject to motive fluid essentially at supply pressure.

As previously mentioned, the water pressure regulating valve casing 24 is threadedly retained in the backhead 18 and the interior end of the casing bears against a valve seat retainer 42 which serves to hold a resilient valve seat 44 and also provide a support for a deformable sealing member 46 which in turn sealingly surrounds and supports a cleaning water tube 48. As is common practice in the construction of rock drills of this type, the water tube extends axially through the drill and the distal end of the tube is telescopically received by the hollow drill steel for conveying drill hole cleaning water thereto. A flanged end portion 49 of the water tube backed by a washer 51 prevents longitudinal displacement of the tube from the valve seat retainer. The valve casing 24 is divided into a flow chamber 50 and a stepped pressure chamber having diameters 52 and 54, the flow chamber and stepped pressure chamber being separated by a partition 56.

The flow chamber 50 houses a valve element 58 which is axially reciprocable to engage the seat 44 or to be in the open position shown in FIG. 2. A stem portion 60 of the valve extends through the partition 56 from the flow chamber 50 to the pressure chamber where it is attached to a stepped piston type valve actuator 64. The valve actuator is slidably disposed in the valve casing and divides the pressure chamber into the pressure cavities 62 and 65. O-rings 66 and 68 seal the respective cavities, however, leakage of fluid from either cavity may be vented to atmosphere through aperture 70. A coil spring 72 bearing against a valve casing cover 74 and against the piston actuator 64 biases the valve to the closed position.

The valve is operated to be in the open position by the supply of drill motive fluid to the pressure cavity 62 to act on the face of piston 64 exerting an axial force opposing the spring bias. In the position of the throttling valve 28 shown in FIG. 2 compressed air motive fluid flows from the hollow interior 30 through a hole 76 to a partially circumferential groove 78 and then through passage 80 to the annular space 82, thence through aperture 84 in the valve casing into the pressure cavity 62.

Figure 3:
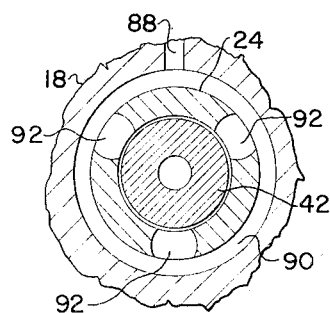
FIG. 3 is a section taken along the line 3—3 of FIG. 2.

As the regulating valve is opened by the drill motive fluid, cleaning water may flow from the interior 86 of the water supply hose fitting through the passage 88 into the annular area 90, through recesses 92 in the valve casing (see FIG. 3) and into the flow chamber 50 and past the valve 58 to the water tube 48. A passage 94 communicates water at the pressure as it passes the valve seat 44 to the pressure cavity 65 thereby providing for a pressure force to be exerted on the face of the actuator piston 64 opposing the pressure force of the drill motive fluid and tending to close the valve.

Due to the greater axial projected area of the actuator piston portion disposed in the second pressure cavity 65, with sufficient water pressure the valve will be actuated to close. As the valve element 58 moves toward the seat 44, an exponentially decreasing flow area bound by the diameter 93 of the valve element 58 and the arcuate surfaces 95 on the valve seat retainer throttles the flow of water to the water tube until the water pressure in the cavity 65 reaches a value where the forces exerted on the actuator piston 64 by the motive fluid and the cleaning water are balanced.

The exponential decrease in flow area of the water valve associated with movement of the valve and actuator piston assembly, and the well rounded orifice contraction formed by the arcuate surfaces 95 provide for stability in valve action by avoiding erratic pressure fluctuations as the flow is throttled to approach the balanced proportional pressure condition. The water pressure to the tube 48 is thereby sensed by an actuating mechanism and regulated to a valve proportional to the pressure of the motive fluid. The regulated water pressure is held to a value less than that of the motive fluid due to the fact that the larger face area of the piston actuator portion disposed in the cavity 65 will require water at lower pressure to balance the force exerted by the pressure of the motive fluid acting on the smaller area of the piston actuator portion located in the cavity 62.

Regulation of the water pressure to a value less than the motive fluid pressure is desirable. For example, should the sealing element 46 surroundingly sealing the water tube 48 become ineffective, water downstream of the valve seat 44 could flow around the tube head 49 and through the clearance 98 between the water tube 48 and the backhead 18 into the interior of the drill, only however, if the water pressure were not regulated to a value less than the motive fluid pressure. Another likely point where leakage into the drill occurs is at the aforementioned distal end (not shown) of the water tube 48 which in conventional rock drills telescopes into a bore in the drill steel. A circumferential seal is usually psovided in the drill steel bore and surrounding the tube diameter. Failure of this seal will also result in unwanted flooding of the drill interior if water pressure is greater than the pressure of the motive fluid.

The water pressure regulating valve is operated in conjunction with the drill throttling valve 28 and is completely automatic. In typical operation the drill throtting valve would initially be in a position rotated clockwise from the position shown in FIG. 2 which would block the radial port 32 and would place a primarily axial slot 100 in communication with the passage 80, and as described above, with the cavity 62. The axial slot 100 is vented to atmosphere through one end of the cylindrical throttling valve 28 thereby venting the cavity 62. The bias of the spring 72 keeps the valve closed when the drill is not operating. As the drill operator rotates the throttling valve 28 counterclockwise (as viewed) to the position shown in FIG. 2 to bring the radial port 32 into communication with the area 34 and provide motive fluid to the drill, motive fluid would also flow first to the passage 80 as the circumferential slot 78 is located to provide flow to the water valve before the main flow to the drill is permitted. The water valve would then open and as water flow to the cavity 65 occurred, pressure regulation would automatically take place as aforedescribed to provide uniform flow of cleaning water at a pressure proportional to the drill motive fluid.

In practice the proportional value of water pressure found to be most suitable is approximately 75 percent of the drill motive air pressure. Therefore, the effective pressure areas on the piston actuator 64 are designed, with compensation for the spring bias force, to provide this proportional value. It will be appreciated that other proportional values could be easily selected and a series of interchangeable valve assemblies made available each being suitable for particular operating conditions of the drill.

What is claimed is:
1. A pressure proportioning valve for a pressure fluid operated rock drill having a water coduit for transmitting water from a supply to a drill steel and having a throttle valve for admitting pressure fluid to said drill, which comprises:
   valve closure means for said proportioning valve;
   valve actuating means operably connected to said closure means for operating the same between open and closed positions, said actuating means comprising a piston reciprocably disposed in a pressure chamber and having differential diameters dividing said chamber into first and second pressure cavities, said differential diameters defining first and second pressure surfaces of differential area;

first passage means communicating drill operating pressure fluid to said first pressure cavity;

second passage means communicating said second pressure cavity with said water conduit downstream of said proportioning valve; whereby, in response to admission of drill operating pressure fluid to said first cavity, said actuator operates to open said closure means; and, in response to admission of water from downstream of said proportioning valve to said second cavity, said actautor operates said closure means toward its closed position.

2. The invention according to claim 1 wherein:

said first pressure surface has an effective area less than said second pressure surface thereby defining a pressure regulation valve means in which said water pressure to said drill steel is regulated to a value less than the pressure of said drill operating fluid.

References Cited

UNITED STATES PATENTS

| | | | |
|---|---|---|---|
| 2,645,239 | 7/1953 | Horn | 137—87 |
| 2,721,540 | 10/1955 | Fuehrer | 173—77 |
| 2,728,328 | 12/1955 | Fuehrer | 173—77 |
| 2,777,424 | 1/1957 | Fuehrer | 173—77 |
| 3,099,282 | 7/1963 | Killer | 137—87 |

FOREIGN PATENTS 1,182,172  11/1964  Germany.

WILLIAM F. O'DEA, Primary Examiner

W. H. WRIGHT, Assistant Examiner

U.S. Cl. X.R.

137—87; 173—77